Oct. 6, 1931.   O. J. OSTLIND   1,826,088
PRESSURE OPERATED VALVE

Filed March 11, 1929

WITNESS

INVENTOR
Oscar Joel Ostlind,
BY
ATTORNEY

Patented Oct. 6, 1931

1,826,088

UNITED STATES PATENT OFFICE

OSCAR JOEL OSTLIND, OF MARSHFIELD, OREGON

PRESSURE OPERATED VALVE

Application filed March 11, 1929. Serial No. 346,225.

My invention relates to pressure operated valves and has as one of its objects the provision of a valve which is automatically operated to open position by pressure in a pipe line or the like when pressure at one side of the valve is permitted to exhaust to the atmosphere.

A further object of the invention is to provide a normally closed valve which is held in closed position by a balanced pressure and which is automatically operated to open position when the pressure is unequalized.

With the preceding and other objects and advantages in mind the invention consists in the novel combination of elements, constructions and arrangements of parts, and operations to be hereinafter specifically referred to, claimed and illustrated in the accompanying drawings, wherein:

Figure 1:
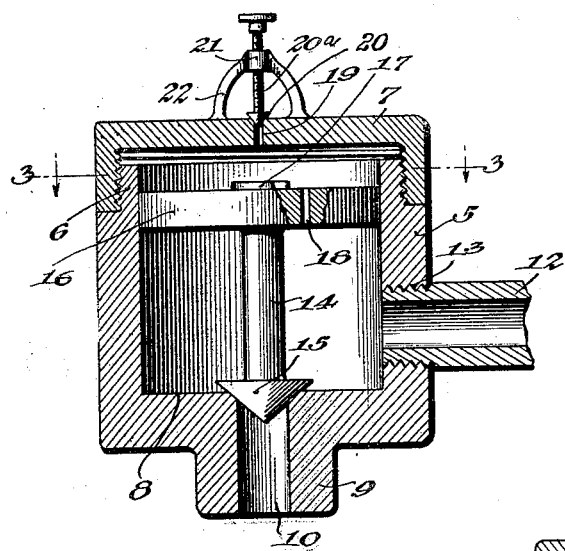
Figure 1 is a vertical sectional view of my improved valve in closed position.

Referring to the drawings in detail a cylindrical casing 5 having a reduced exteriorly threaded upper end 6 with which a closure cap 7 is engaged, is provided. The casing 5 has a bottom wall 8 which is formed with a central laterally projecting boss 9, the latter being formed with a bore or outlet 10 whose inner end terminates in a valve seat 11. A conduit 12 leading to a source of liquid or fluid pressure has one end threaded into one side of the casing as at 13.

For the purpose of permitting liquid or fluid pressure to by pass from the conduit 12 through the bore 10 a normally balanced valve is arranged in the casing. This valve comprises a shank or stem 14 the lower end of which is formed with a conical shaped valve element 15 adapted to seat upon the seat 11. A piston 16 is attached to the upper end of the shank or stem by means of a set screw 17 passing centrally through the piston and engaged with the shank. The piston is of such diameter as to snugly fit within the casing 5 and contact with the walls of the latter. In order to permit pressure fluid flowing into the cylinder or casing 5 to equalize upon opposite sides of the piston to hold the valve element 15 against the seat 11 a vertically extending bleed port 18 is formed in the piston at one side of the shank or stem.

Figure 2:
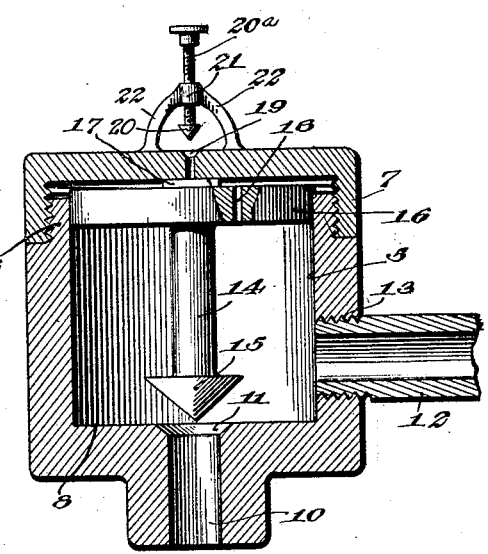
Fig. 2 is a similar view showing the valve in open position.
Figure 3:
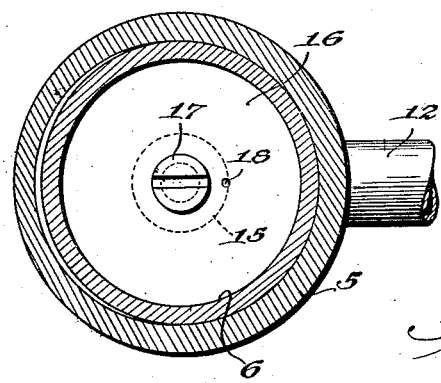
Fig. 3 is a horizontal section taken on line 3—3 of Fig. 1.
Figure 4:
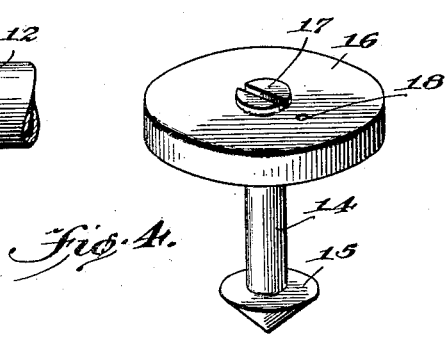
Fig. 4 is a perspective of the valve element and associated actuating piston embodied in the invention.

The head of the screw 17 is formed upstanding from the upper face of the piston 16 and is adapted to serve a dual purpose. The groove or slot in the head with which a screw driver is engaged when tightening or loosening the screw, it will be noted, is in alinement with port 19 and thereby forms a passage or avenue of escape for the liquid above the piston when the parts are in the position shown in Figure 2. The head being upstanding from the piston also serves the purpose of spacing the face of the piston from the top wall of the pressure chamber, as shown in Figure 2, and thereby prevents sealing of the bleed port 18, which would be the case if the piston were allowed to come into face contact with said wall.

For the purpose of diminishing the pressure above the piston when it is desired to permit the valve to open an outlet port 19 is provided at the center of the cap 7. This outlet port 19 is normally closed by a manually operable valve 20, the stem of which is threaded as at 20ª and which is vertically adjustable in a threaded guide 21 located in vertical alignment with the port 19 and supported in arms 22 arising from the upper face of the cap 7. It will be observed that as the pressure fluid from the conduit 12 enters the casing 5 the piston 16 will be balanced to hold the valve seated by reason of some of the pressure fluid passing through the bleed port 18. When it is desired to unseat the valve 15 the valve 20 is raised to the position disclosed in Fig. 2 to permit the pressure fluid above the piston to exhaust to the atmosphere. The pressure now below the piston raises the latter permitting pressure fluid in the conduit 12 to by pass through the port 10. After the desired amount of pressure fluid has been permitted to by pass the valve 20 is moved to closed position so that the pressure in the casing will again become equalized preparatory to the next operation.

What is claimed is:

1. In a pressure actuated valve, a reciprocable valve member comprising a head with a separable stem, a casing having a port for the escape of fluid above said head, and a screw for connecting the separable head and stem, said screw having a head upstanding from the valve head and a slot registrable with said port to provide an avenue of fluid escape when said head is in its uppermost position.

2. In a pressure actuated valve, a cylindrical pressure chamber having top and bottom walls and a pressure inlet, a piston reciprocable in said chamber and having a bleed port, a valve stem carried by said piston and separable therefrom, said stem having a valve element formed at the lower end thereof, said bottom wall of said chamber having an outlet in axial alinement with said stem and valve element, and a valve seat at the inner end of said outlet, a screw for connecting the separable head and stem, the top wall of said chamber having an exhaust port, a bracket carried by said top wall and supporting a guide in vertical alinement with said port, a valve adjustable in said guide and adapted to cooperate with said port, said screw having a head upstanding from said piston and a slot registrable with said port to provide an avenue of fluid escape when said piston is in its uppermost position.

OSCAR JOEL OSTLIND.